(12) United States Patent
Yoneyama

(10) Patent No.: US 6,361,464 B1
(45) Date of Patent: Mar. 26, 2002

(54) CONTROL DEVICE OF AUTOMATIC TRANSMISSION

(75) Inventor: Nobuyuki Yoneyama, Fuji (JP)

(73) Assignee: Jatco Transtechnology Ltd. (JP)

( * ) Notice: Subject to any disclaimer, the term of this patent is extended or adjusted under 35 U.S.C. 154(b) by 0 days.

(21) Appl. No.: 09/598,611

(22) Filed: Jun. 21, 2000

(30) Foreign Application Priority Data

Jun. 25, 1999 (JP) ............................................. 11-180788

(51) Int. Cl.⁷ ................................................ F16H 31/00
(52) U.S. Cl. ........................ 475/116; 475/118; 475/120; 475/127
(58) Field of Search ................................. 475/116, 118, 475/119, 121, 127, 128

(56) References Cited

U.S. PATENT DOCUMENTS 4,981,052 A   1/1991   Gierer ......................... 74/866

*Primary Examiner*—Sherry Estremsky
*Assistant Examiner*—Tisha D. Lewis
(74) *Attorney, Agent, or Firm*—Rossi & Associates (57) ABSTRACT

A control device of an automatic transmission has automatic shift ranges and manual setting ranges including a first speed gear position at which an engine brake is operable. The control device turns on all solenoid valves at the first speed gear position in the automatic shift driving range, turns on only the second and third solenoid valves at the first speed gear position in the manual setting range, and turns on at least one of the three solenoid valves in normal operation. This prevents a shock resulting from a shift and easily starts a vehicle even if all of the three solenoid valves supplying oil pressure to the first through third shift valves for changing gear positions are turned off. Oil channels are preset in such a manner as to achieve a high speed gear position if no oil pressure is supplied to all shift valves. If all solenoid valves are turned off in the manual setting range, low speed gear position selecting oil channels supplied with an oil pressure from a manual valve are connected to the second and third shift valves through a failsafe valve so that the gear position can be shifted to the first speed gear position at which the engine brake is operable.

3 Claims, 12 Drawing Sheets

| Gear position | C1 | C2 | C3 | B1 | OC1 | B2 | C4 | B3 | OC2 | Solenoid | | | | |
|---|---|---|---|---|---|---|---|---|---|---|---|---|---|---|
| | | | | | | | | | | SA | SB | SC | SD | SE |
| 1st speed with engine brake | | | O | O | O | | | O | O | × | O | O | O | × |
| 1st speed without engine brake | | | O | | O | | | O | O | O | O | O | O | × |
| 2nd speed | | O | O | | | O | | O | O | O | O | × | O | × |
| 3rd speed | | O | O | | | | | O | O | × | O | × | O | × |
| 4th speed | | O | | | | O | O | | O | × | × | O | O | × |
| 5th speed | | | | | | O | | O | | O | × | O | O | O |
| Reverse | O | | | O | | | | O | | O | O | O | × | O |

CONTROL DEVICE OF AUTOMATIC TRANSMISSION

BACKGROUND OF THE INVENTION

1. Field of the Invention

The present invention relates to a control device of an automatic transmission for vehicles.

2. Description of the Prior Art

A conventional control device of an automatic transmission for vehicles is disclosed, for example, in Japanese Patent Application Laid-open Publication No. 4-351356. This automatic transmission comprises a main transmission mechanism arranged coaxially with a torque converter and a sub transmission mechanism arranged in parallel with the main transmission mechanism. In this automatic transmission, the control device achieves a plurality of gear positions by engaging and disengaging friction elements such as planetary gear mechanisms, clutches, brakes and one-way clutches.

In the control device of the automatic transmission mechanism, an automatic transmission control unit (hereinafter referred to as an ATCU) determines a gear position suitable for driving conditions, on-off controls solenoid valves in the control device, switches shift valves by an oil pressure supplied through the solenoid valves, and changes the gear positions by supplying and releasing oil pressure to and from the friction elements by the shift valves.

An ordinary control device has a parking range, a rear driving range (hereinafter referred to as a R range), a neutral range, an automatic shift driving range (hereinafter referred to as a D range), a 3 range in which a vehicle is driven forward at a first, second or third speed gear position, a 2 range in which a vehicle is driven forward at the first or second speed gear position, a 1 range in which the vehicle is driven forward only at the first speed gear position.

The conventional control device of the automatic transmission cuts a reverse driving force from wheels and does not operate an engine brake at a slow speed gear positions in the D range in order to prevent a shock resulting from an automatic shift from a high speed gear position to a low speed gear position.

If the ATCU malfunctions, however, it becomes impossible to control the solenoid valves for setting a gear position and this fixes the state of the shift valves for use in changing the gear positions.

If the ATCU malfunctions to fix the gear position at a high speed gear position or the like, it is possible to continue driving the vehicle that is still running. Once the vehicle stops running, however, it is difficult to start the vehicle again.

SUMMARY OF THE INVENTION

It is therefore an object of the present invention to provide an improved control device of an automatic transmission, which prevents the shock resulting from the shift even if there is a malfunction during the driving and which easily starts the vehicle after it stops.

The above object can be accomplished by providing a control device of an automatic transmission, which has an automatic shift range for automatically selecting a gear position according to driving conditions of a vehicle, and a manual setting range for manually changing gear positions and having at least a low speed engine brake range in which the vehicle is driven at a lowest speed gear position with an engine brake being operable, the control device of the automatic transmission comprising: an operating pressure control circuit for controlling an operating pressure supplied to and released from friction elements for selectively changing power transmission routes of a transmission mechanism; wherein the operating pressure control circuit comprises: a plurality of shift valves for changing supply and release channels for supplying and releasing the operating pressure to and from the friction elements according to the selected gear position; first signal pressure generating means for supplying and releasing a signal pressure for controlling shift positions of the shift valves; shift control means for controlling the first signal pressure generating means according to the selected gear position; second signal pressure generating means for supplying a low speed range signal pressure if a low speed engine brake range is manually designated; first fail range achieving means for achieving a lowest speed gear position at which the vehicle is driven with the engine brake being operable if the shift control means fails and if the second signal pressure generating means supplies a low speed range signal pressure; and second fail range achieving means for achieving a predetermined gear position other than low speed gear positions if the shift control means fails and if the second signal pressure generating means does not supply low speed range signal pressure.

Accordingly, even if the control unit as the shift control means, or the like, malfunctions while the vehicle is running in a range other than the low speed engine brake range, the second fail range achieving means achieves a predetermined gear position other than low speed gear positions since there is no supply of low speed range signal pressure from the second signal pressure generating means. Therefore, the gear position never shifts to the lowest speed gear position at which the vehicle is driven with the engine brake being operable. This prevents the shock due to the shift.

If the control unit as the shift control means, or the like, malfunctions while the vehicle is driven in the low speed engine brake range, there is the supply of the low speed range signal pressure from the second signal pressure generating means. Therefore, the first fail range achieving means achieves the lowest speed gear position at which the engine brake is operable.

Moreover, even if the control unit or the like malfunctions to thereby stop the vehicle, the low speed engine brake range is selected so as to shift the gear position to the lowest speed gear position at which the vehicle is driven with the engine brake being operable. Thus, the vehicle can easily be started.

Thus, if the control unit or the like malfunctions, the low speed engine brake range is selected to start the vehicle at the lowest speed gear position with the engine brake being operable. When a vehicle speed is increased, the range is switched to another range to cause the vehicle to run by itself at a predetermined gear position other than the low speed gear positions.

The above object can also be accomplished by providing a control device of an automatic transmission, which has automatic shift ranges for automatically selecting a gear position according to driving conditions of a vehicle, and manual setting range for manually changing gear positions and having at least a low speed engine brake range in which the vehicle is driven at a lowest speed gear position with an engine brake being operable, the control device of the automatic transmission comprising: a first shift valve, a second shift valve and a third shift valve for changing the connecting state of oil channels supplying an oil pressure to friction elements for setting the gear position; a first switching oil channel for supplying an oil pressure for changing the connecting state of the first shift valve; a first solenoid valve that is on-off controlled in such a manner as to supply an oil pressure to the first switching oil channel in a state of being on; a second switching oil channel for supplying an oil pressure for changing the connecting state of the second shift valve; a second solenoid valve that is on-off controlled in such a manner as to supply an oil pressure to the second switching oil channel in a state of being on in normal operation; a third switching oil channel for supplying an oil pressure for changing the connecting state of the third shift valve, and a third solenoid valve (SC) that is on-off controlled in such a manner as to supply an oil pressure to the third switching oil channel in a state of being on in normal operation; a shift control part for controlling the ON/OFF state of the first, second and third solenoid valves according to a designated range in such a manner as to turn on the first, second and third solenoid valves if the lowest speed gear position is selected in the automatic shift dive range, and turn off the first solenoid valve and turn on the second and third solenoid valves if the lowest speed gear position at which the vehicle is driven with the engine brake being operable is selected; the shift control part turning on at least one of the first, second and third solenoid valves in normal operation; a manual valve for selectively connecting oil pressure sources to oil channels by manual operation; a low speed gear position selecting channels which is supplied with an oil pressure from the manual valve when the low speed engine brake range is selected; a failsafe valve for connecting low speed gear position selecting channels with the second and third switching oil channels if the first, second and third solenoid valves are turned off; and wherein the first, second and third shift valves connect to the friction elements in such a manner as to set a predetermined gear position other than the low speed gear positions if the oil pressure is not supplied to the first, second and third switching oil channels.

Accordingly, no oil pressure is supplied to the first, second and third switching oil channels when the first, second and third solenoid valves are turned off while the vehicle is driven in the automatic shift driving range or the manual setting range other than the low speed engine brake range. Thus, the gear position other than the low speed gear positions is set. Therefore, even if the control unit or the like malfunctions while the vehicle is driven in the automatic shift driving range or the manual setting range other than the low speed engine brake range, the gear position never shifts to the lowest speed gear position at which the vehicle is driven with the engine brake being operable. This prevents the shock due to the shift.

If all the solenoid valves for changing the gear positions are turned off while the vehicle is driven in the low speed engine brake range, the oil pressure is supplied from the manual valve to the second and third switching oil channels through the first oil channel, the failsafe valve and the second oil channel. This shifts the gear position to the lowest speed gear position at which the vehicle is driven with the engine brake being operable.

If the vehicle stops running due to the malfunction of the control unit or the like, the gear position can be shifted to the lowest speed gear position by designating the low speed engine brake range.

If the control device or the like malfunctions, the vehicle is started in the low speed engine brake range, which is then switched to another range when the vehicle speed is increased. Therefore, the vehicle can run by itself at a gear position other than the low speed gear positions.

In the normal operation, the first, second and third solenoid valves are turned off when the first speed gear position in the automatic shift driving range, i.e., the lowest speed gear position at which the engine brake is not operable is selected.

While a gear position other than the lowest speed gear position is selected, at least one solenoid valve is off. Thus, at least two solenoid valves are turned off when one of the solenoid valves that should be normally on is turned off due to the breaking of wire.

Accordingly, even if one of the solenoid valves that should be normally on is turned off the gear position does not shift to the lowest speed gear position at which the engine brake is operable, and shock resulting from the shift is prevented.

Particularly in the case where the automatic shift driving range has the first speed gear position as the lowest speed gear position through the fifth speed gear position as the highest speed gear position, the gear position can be switched to the fourth speed gear position if no oil pressure is supplied to the first, second and third switching oil channels. By this feature, the shock resulting from the shift is surely prevented, since the gear position shifts to a higher speed gear position when the control unit or the like malfunctions while the vehicle is running in a low speed range other than the low speed engine brake range or in the automatic shift driving range.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein.

DETAILED DESCRIPTION OF THE PREFERRED EMBODIMENT

A preferred embodiment of the present invention will be described below.

First, there will be described a power transmission device of an automatic transmission according to the preferred embodiment.

Figure 1:
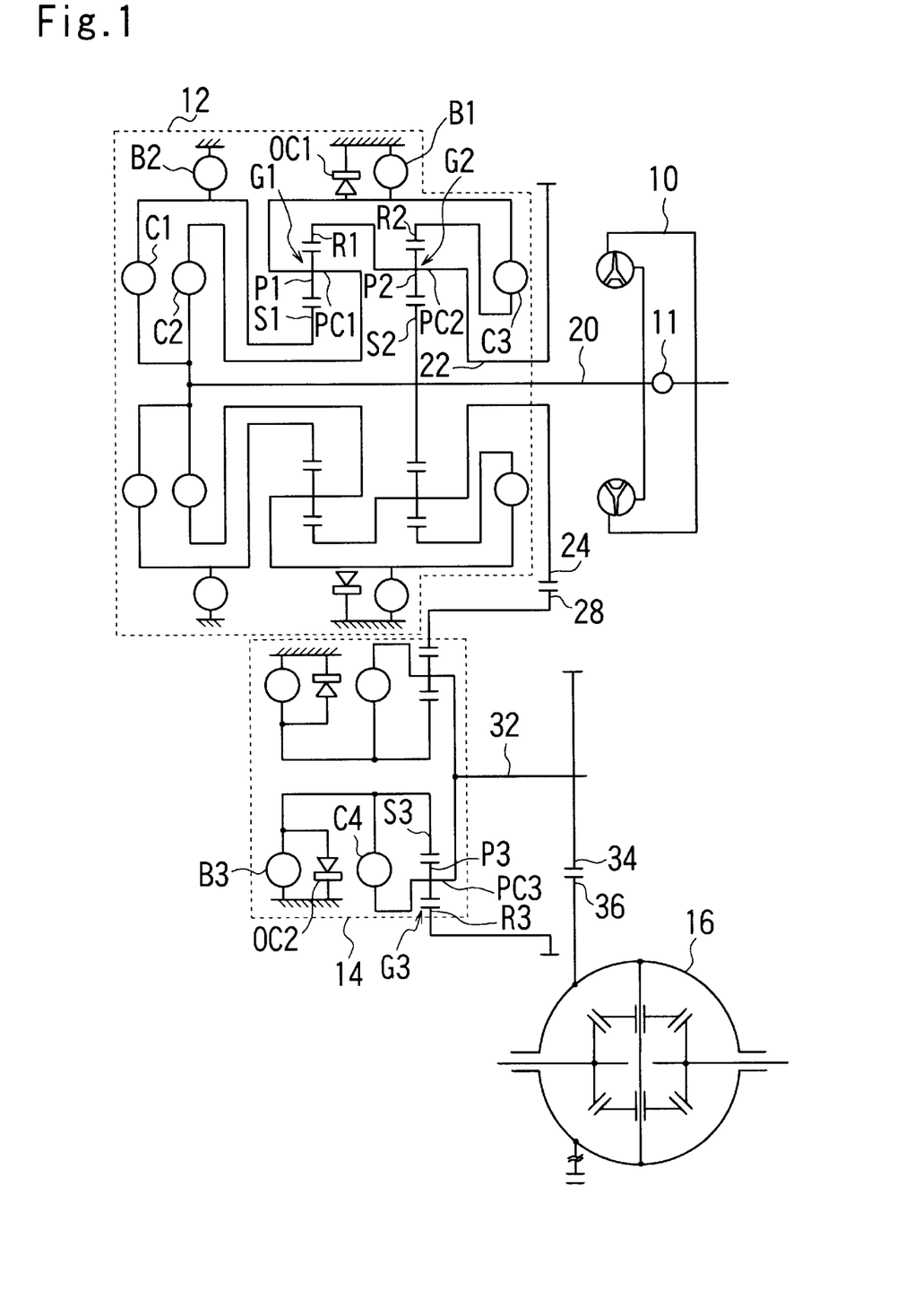
FIG. 1 is a schematic diagram showing a power transmission device of an automatic transmission according to the present invention.

FIG. 1 is a schematic diagram showing the power transmission device that is capable of changing gear positions at five speed gear positions in forward driving and one speed gear position in backward driving according to the preferred embodiment. The power transmission device has a torque converter 10, a main transmission mechanism 12, a sub transmission mechanism 14, and a final drive mechanism 16 for driving wheels. The main transmission mechanism 12 is coaxial with the torque converter 10, and the sub transmission mechanism 14 is parallel with the main transmission mechanism 12.

The torque converter 10 to which a lockup mechanism 11 is attached receives a torque from an engine (not shown). An output of the torque converter 10 is inputted to the main transmission mechanism 12 through a shaft 20.

The main transmission mechanism 12 comprises a first planetary gear mechanism G1, a second planetary gear mechanism G2, a reverse clutch C1, a high clutch C2, a low clutch C3, a low reverse brake B1, a 2–4 brake B2, and a low one-way clutch OC1. The main transmission mechanism 12 converts the torque inputted from the shaft 20 and outputs the converted torque to a shaft 22. The first planetary gear mechanism G1 is arranged on the shaft 20, and comprises a sun gear S1, an internal gear R1, a pinion gear P1 that is engaged with the sun gear S1 and the internal gear R1 at the same time, and a carrier PC1 that supports the pinion gear P1. The second planetary gear mechanism G2 is also arranged on the shaft 20, and comprises a sun gear S2, an internal gear R2, a pinion gear P2 that is engaged with the sun gear S2 and the internal gear R2 at the same time, and a carrier PC2 that supports the pinion gear P2.

The reverse clutch C1, the high clutch C2, the low clutch C3, the low reverse brake B1, the 2–4 brake B2 and the low one-way clutch OC1 are operated in a variety of combinations. It is therefore possible to change the rotational conditions of each elements of the first planetary gear mechanism G1 and the second planetary gear mechanism G2, and change the rotation speed of the shaft 22 with respect to the rotation speed of the shaft 20. The shaft 22 is integrated with a main output gear 24, and is engaged with a sub input gear 24 connected to the sub transmission mechanism 14.

The sub transmission mechanism 14 has a third planetary gear mechanism G3, a direct clutch C4, a reduction brake B3 and a reduction one-way clutch OC2. The sub transmission mechanism 14 converts the torque inputted from the sub input gear 28 and outputs the converted torque to a shaft 32. The third planetary gear mechanism G3 comprises a sun gear S3, an internal gear R3 that is integrally connected to the sub input gear 28, a pinion gear P3 that is engaged with the sun gear S3 and the internal gear R3 at the same time, and a carrier PC3 that supports the pinion gear P3 and is connected to the shaft 32 in such a manner as to rotate integrally with the shaft 32.

The direct clutch C4, the reduction brake B3 and the reduction one-way clutch OC2 are operated in a variety of combinations. It is therefore possible to change the rotational conditions of the elements of the third planetary gear mechanism G3, and changes the rotation speed of the shaft 32 with respect to the rotation speed inputted from the sub input gear 28.

The shaft 32 is integrated with a sub output gear 34, and is engaged with a final gear 36 that is connected to the final drive mechanism 16 in such a manner as to rotate integrally with the final drive mechanism 16.

The torque inputted from the engine to the automatic transmission is sequentially transmitted to the torque converter 10, the shaft 20, the main transmission mechanism 12, the main output gear 24, the sub input gear 28, the sub transmission mechanism 14, the shaft 32, the sub output gear 34, the final gear 36 and the final drive mechanism 16.

Figure 2:
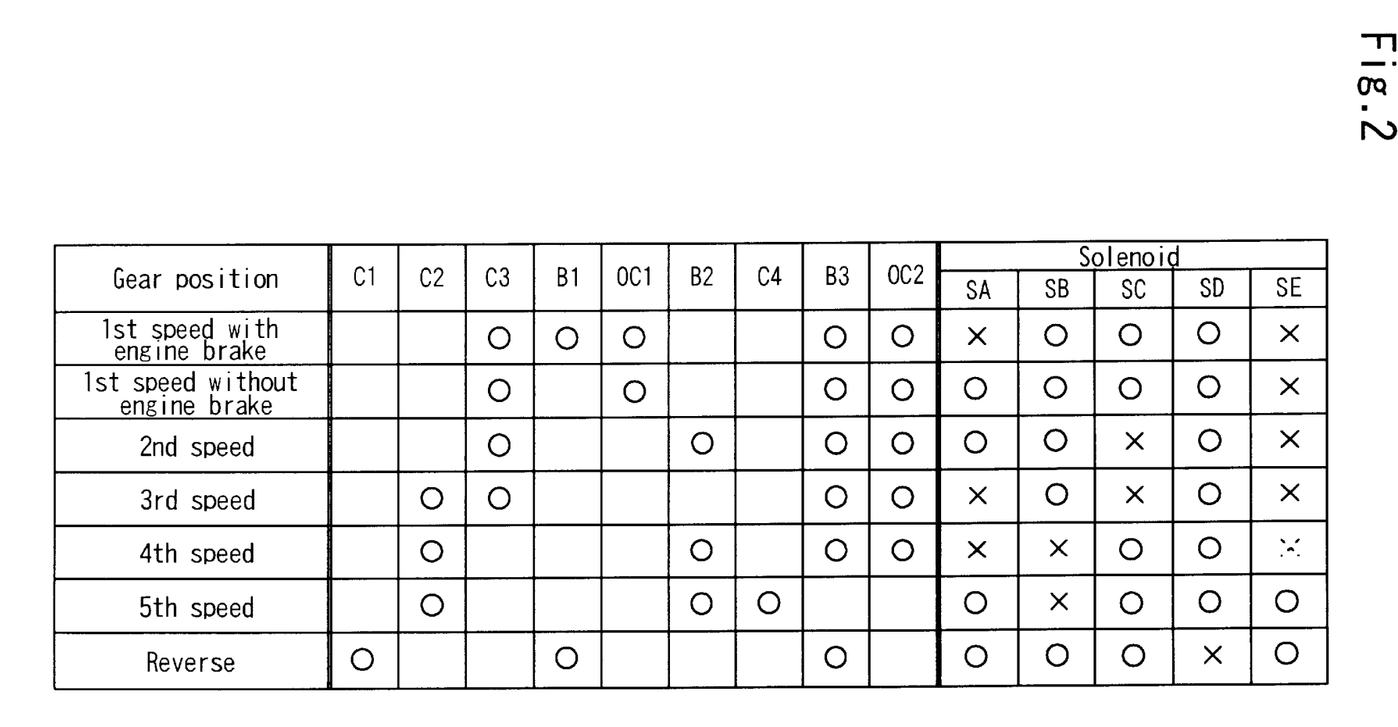
FIG. 2 is a view showing operational combinations of engagement elements for changing gears.

During the transmission of the torque; the clutches, the brakes, etc. are operated in such combinations as shown in FIG. 2 to thereby change gears in five forward driving speed gear positions and one reverse driving speed gear position. A circular mark indicates the engaged state. A relationship between the ON/OFF state of solenoid valves and the gear positions will be described later.

If a D range is designated as a shift position by a shift lever, the gears can be shifted in five forward driving speed gear positions. In this case, a vehicle is driven with an engine brake being operable between the fifth speed gear position and the second speed gear position. If the first speed gear position is automatically selected, a reverse driving force is cut and the engine brake is not operated.

If a 3 range is designated by a shift lever, the gears can be shifted at three positions in the forward driving between the first speed gear position and the third speed gear position. In this case, the vehicle is driven with the engine brake being operable at all the gear positions.

If a 2 range as a low speed engine brake range is designated, the gears can be shifted at two positions in the forward driving between the first speed gear position and the second speed gear position. The engine brake is operable at all the gear positions.

If a 1 range as a low speed engine brake range is designated, the vehicle is driven with the engine brake being operable.

If an R range is designated, the vehicle is driven backward at the one speed gear position.

Figure 3:
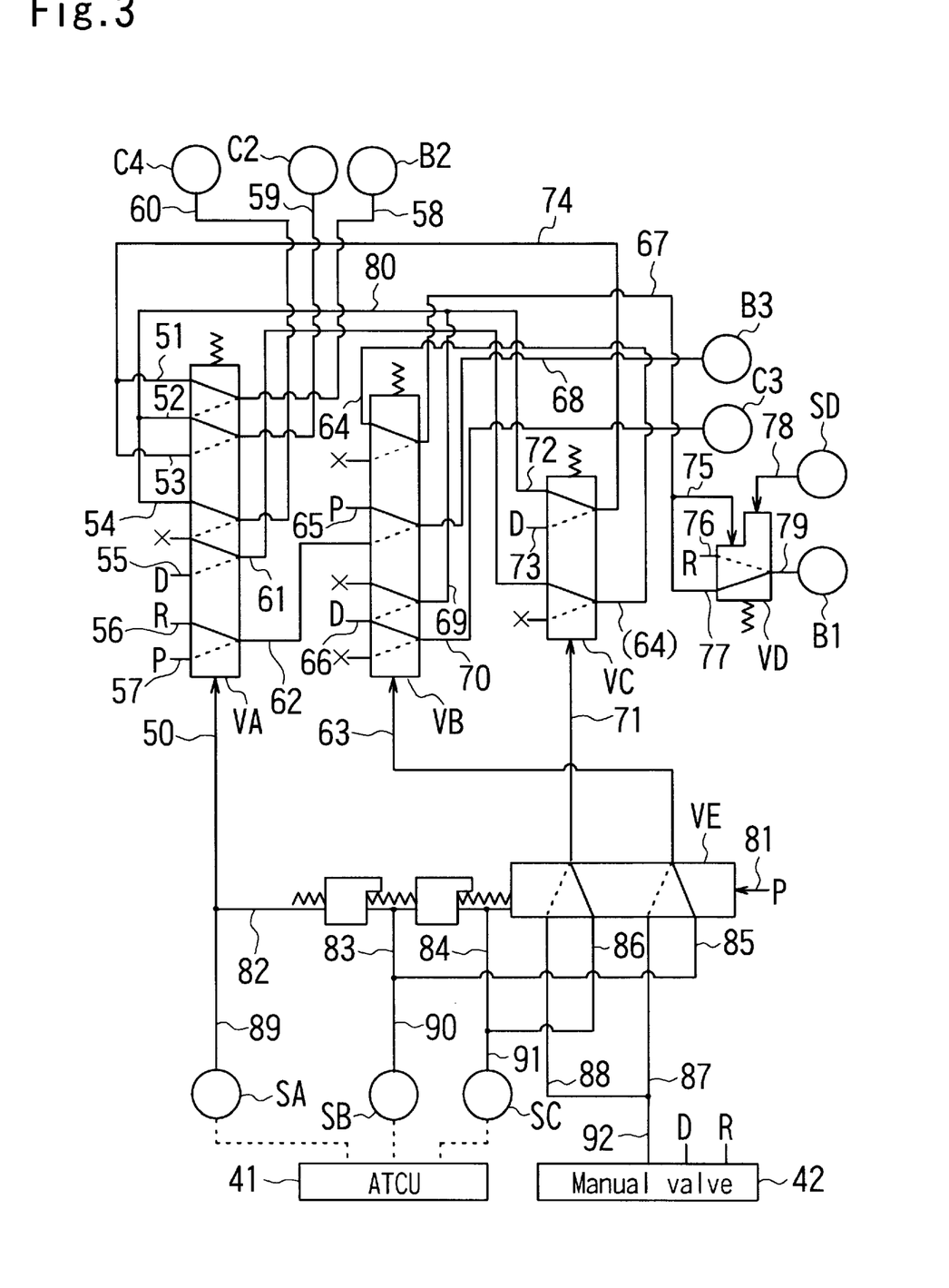
FIG. 3 is a view showing the structure of an embodiment of the present invention.

FIG. 3 shows a part of an oil pressure control circuit of the power transmission device, which is directly related to the present invention. The oil pressure control circuit controls an oil pressure supplied to the high clutch C2, the low clutch C3, the direct clutch C4, the 2–4 brake B2 and the reduction brake B3. The oil pressure control circuit comprises three shift valves VA, VB, VC that control the engagement and disengagement, a reverse inhibit valve VD for controlling an oil pressure supplied to the low reverse brake B1, a failsafe valve VE for failsafe operation, a solenoid valve SA, a solenoid valve SB, a solenoid valve SC, a low clutch timing valve SD, an ATCU 41 for controlling the ON/OFF of each solenoid valve, a manual valve 42, and oil channels 50–92. Each shift valve is switched by supplying and releasing the oil pressure applied to a valve end face, and changes the connecting state of the oil channels. Each solenoid valve is on-off controlled by the ATCU 41, and controls the supply and release of the oil pressure applied to end faces of the shift valves.

A description will now be given of the connecting state of the oil channels in each shift valve.

First, on the upper end face of the shift valve VA a spring force is applied in a press down direction, and on the lower end face of the shift valve VA an oil pressure supplied through the oil channel 50 is applied in a press up direction. When the oil pressure is supplied to the oil channel 50, the shift valve VA is pressed up into the first state wherein the right and left oil channels thereof connect with one another as indicated by solid lines. More specifically, the oil channel 51 connects with the oil channel 58, the oil channel 52 connects with the oil channel 59, the oil channel 54 connects with the oil channel 60, and the oil channel 56 connects with the oil channel 62. The oil channel 61 is drained through a drain port (indicated by a mark X in FIG. 3).

If the oil pressure is not supplied to the oil channel 50 of the shift valve VA, the shift valve VA is pressed down by the spring force and brought into the second state. The right and left oil channels of the shift valve VA connect with one another as indicated by broken lines in the second state. More specifically, the oil channel 52 connects with the oil channel 58, the oil channel 53 connects with the oil channel 59, the oil channel 55 connects with the oil channel 61, and the oil channel 57 connects with the oil channel 62. The oil channel 60 is drained.

The oil channel 58 connects with the 2–4 brake B2, the oil channel 59 connects with the high clutch C2, and the oil channel 60 connects with the direct clutch C4. The oil channel 61 connects with the shift valve VC, and the oil channel 62 connects with the shift valve VB.

As to the shift valve VB, a spring force is applied in a press down direction, and the oil pressure supplied to the oil channel 63 is applied in a press up direction.

When the oil pressure is supplied to the oil channel 63, the shift valve VB is pressed up and brought into the first state. In this first state, the oil channel 64 connects with the oil channel 67, the oil channel 65 connects with the oil channel 68, and the oil channel 66 connects with the oil channel 70 as indicated by solid lines. The oil channel 69 is drained.

If the oil pressure is not supplied to the oil channel 63 of the shift valve VB, the shift valve VB is pressed down and brought into the second state. In the second state, the oil channel 62 connects with the oil channel 68, and the oil channel 66 connects with the oil channel 69 as indicated by broken lines. The oil channels 67 and 70 are drained. The oil channel 67 connects with oil channels 75 and 77, and the oil channel 68 connects with the reduction brake B3. The oil channel 69 connects with the oil channels 52 and 54 through the oil channel 80, and the oil channel 69 also connects to the oil channel 74. The oil channel 70 connects with the low clutch C3.

As to the shift valve VC, a spring force is applied in a press down direction, and an oil pressure supplied to the oil channel 71 is applied in a press up direction. When the oil pressure is supplied to the oil channel 71, the shift valve VC is pressed up and brought into the first state. In this first state, the oil channel 72 connects with the oil channel 74, and the oil channel 61 connects with the oil channel 64. If the oil pressure is not supplied to the oil channel 71 of the shift valve VC, the shift valve VC is pressed down and brought into the second state. In the second state, the oil channel 73 connects with the oil channel 74. The oil channel 64 is drained. The oil channel 74 connects with the oil channels 51 and 53.

As to the reverse inhibit valve VD an oil pressure supplied to the oil channel 75 and the oil pressure supplied to the oil channel 78 are applied in a press down direction, and a spring force is applied in a press up direction. When the oil pressure is supplied to the oil channel 75 or 78, the reverse inhibit valve VD is pressed down so that an oil channel 77 can connect with an oil channel 79 as indicated by a solid line. If the oil pressure is not supplied to the oil channel 75 and 78 of the reverse inhibit valve VD, the reverse inhibit valve VD is pressed up so that an oil channel 76 can connect with the oil channel 79. The oil channel 78 is connected to a low clutch timing solenoid valve SD, and the oil channel 79 is connected to the low reverse brake B1.

The oil channels 55, 66, 73 are connected to the manual valve 42. A D range pressure (indicated by D in FIG. 3) is supplied to the oil channel 55, the oil channel 66 and the oil channel 73 if a driver selects (designates) the D range, the 3 range, the 2 range or the 1 range.

The oil channels 56 and 76 are also connected to the manual valve 42. An R range pressure (indicated by R in FIG. 3) is supplied to the oil channel 56 and the oil channel 76 if the driver selects an R range. The oil channels 57 and 65 connect to a pilot valve (not shown), and the pilot valve regularly supplies a regulated pilot pressure (indicated by P in FIG. 3) to the oil channels 57 and 65. The low clutch timing solenoid valve SD is kept on the ON state if the forward driving gear position is selected. This presses down the reverse inhibit valve VD, and prevents the R range pressure supplied to the oil channel 76 from being supplied to the low reverse brake B1.

An oil pressure supplied to the channel 81 presses the failsafe valve VE to the left in FIG. 3, and an oil pressure supplied to the oil channels 82, 83, 84 presses the failsafe valve VE to the right in FIG. 3. An acting force generated by the oil pressure supplied to the oil channel 82 or 83 is transmitted to the end face of the failsafe valve VE through springs 95, 96. When the oil pressure is supplied to one of the oil channels 82, 83, 84; the failsafe valve VE shifts to the right. Only when the oil pressure is not supplied to any of the oil channels 82, 83, 84; the failsafe valve VE shifts to the left.

If the failsafe valve VE shifts to the right, the oil channel 63 connects with an oil channel 85 and the oil channel 71 connects with an oil channel 86 as indicated by solid lines. If the failsafe valve VE shifts to the left, the oil channel 63 connects with the oil channel 87 and the oil channel 71 connects with the oil channel 88 as indicated by broken lines. The oil channel 82 connects with the solenoid valve SA through the oil channel 89, and the oil channels 83, 85 connect with the solenoid valve SB through the oil channel 90. The oil channels 84, 86 connect with the solenoid valve SC through with oil channel 91. The oil channel 81 is supplied with a pilot pressure from a pilot valve (not shown in the drawing). The oil channels 87, 88 connect with the manual valve 42 through the oil channel 92, which is supplied with a 1–2 range pressure as a low speed range pressure only when the 1 or 2 range is selected as the shift position.

If a driver manually selects the D range as the shift position, the ATCU 41 operates in the D range wherein the gear positions are automatically changed according to the driving conditions. In this case, an optimum gear position is selected from the five forward gear positions, and the ON/OFF state of the solenoid valves SA, SB and SC is controlled according to the selected gear position.

If the driver designates the 3 range, an optimum gear position is selected from the lower three forward gear positions according to the driving conditions. If the driver designates the 2 range, an optimum gear position is selected from the lower two forward gear positions according to the driving conditions. In this case, the ON/OFF state of the solenoid valves SA, SB and SC is controlled according to the selected gear position.

If the driver designates the 1 range, the ON/OFF state of the solenoid valves SA, SB and SC is controlled to achieve the first speed gear position.

There will now be explained the oil pressure supplied state under the normal control condition.

As shown in FIG. 2, there is not the case in which all of the solenoids SA, SB and SC are turned off when the ATCU 4 is normally operating. Accordingly, the failsafe valve VE shifts to the right, so that the oil pressure is supplied to the oil channel 63 from the solenoid valve SB, and the oil pressure is supplied to the oil channel 71 from the solenoid valve SC. Thus, the connecting state of the oil channels in the shift valves VA, VB and VC is switched according to the ON/OFF state of the solenoid valves SA, SB and SC.

Figure 4:
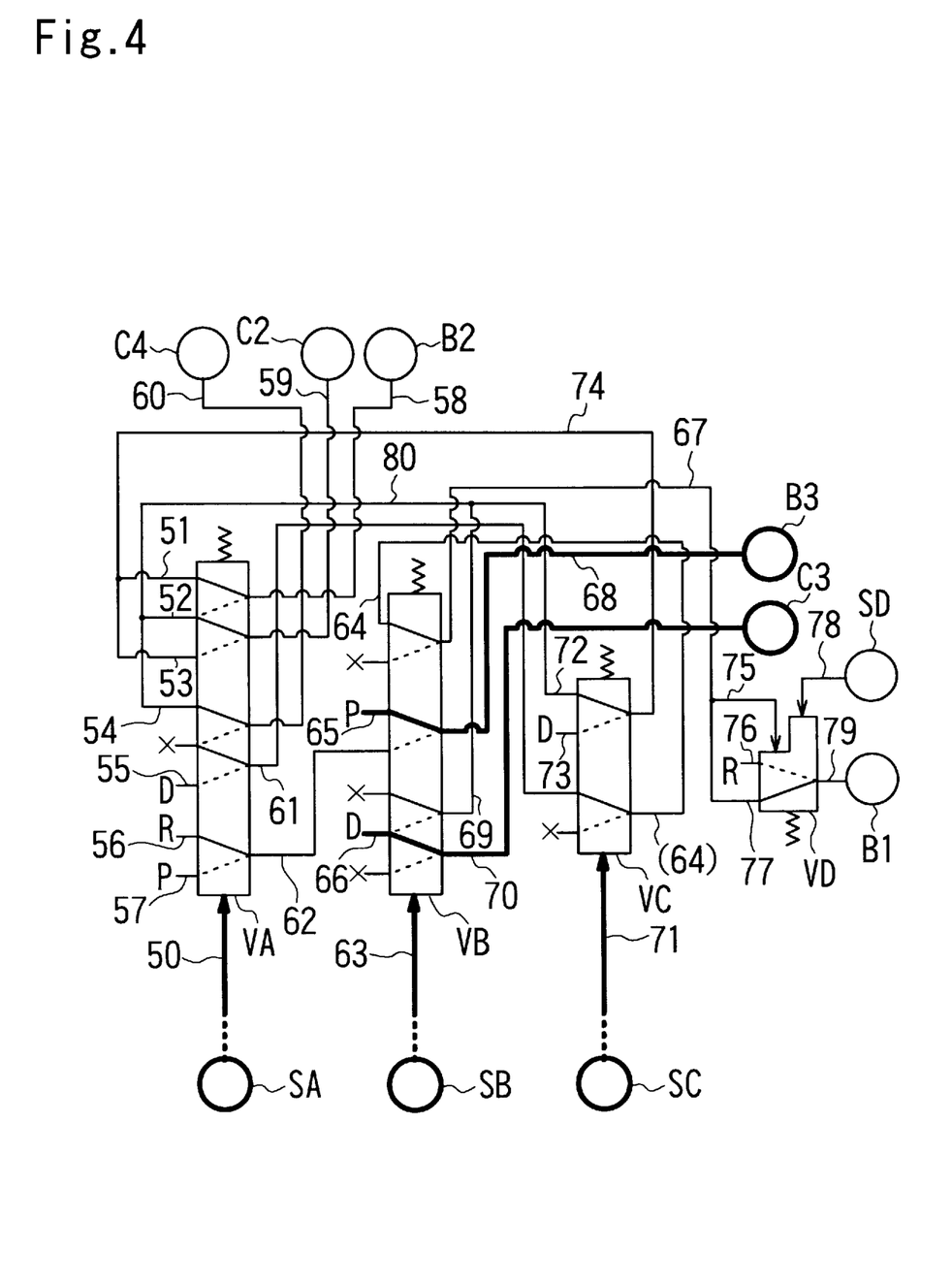
FIG. 4 is a view showing the connecting state of oil channels in the case where a first speed gear position is selected in a D range.

FIG. 4 shows the oil pressure supplied state when the first speed gear position is selected in the D range. The ATCU 41 keeps the solenoid valves SA, SB and SB on, and the shift valves VA, VB and VC are brought into the first state of being pressed up. There are supplied with the D range pressure and the pilot pressure. In this case, the pilot pressure supplied to the oil channel 65 is supplied to the reduction brake B3 through the shift valve VB and the oil channel 68 to engage the reduction brake B3. The D range pressure supplied to the oil channel 66 is supplied to the low clutch C3 through the shift valve VB and the oil channel 70 to engage the low clutch C3. The oil channels connected to the low reverse brake B1 the 2–4 brake B2, the high clutch C2 and the direct clutch C4 are not supplied with the oil pressure since they do not connect with the oil channels supplied with the oil pressure. Thus, the low reverse brake B1, the 2–4 brake B2, the high clutch C2 and the direct clutch C4 are disengaged.

Figure 5:
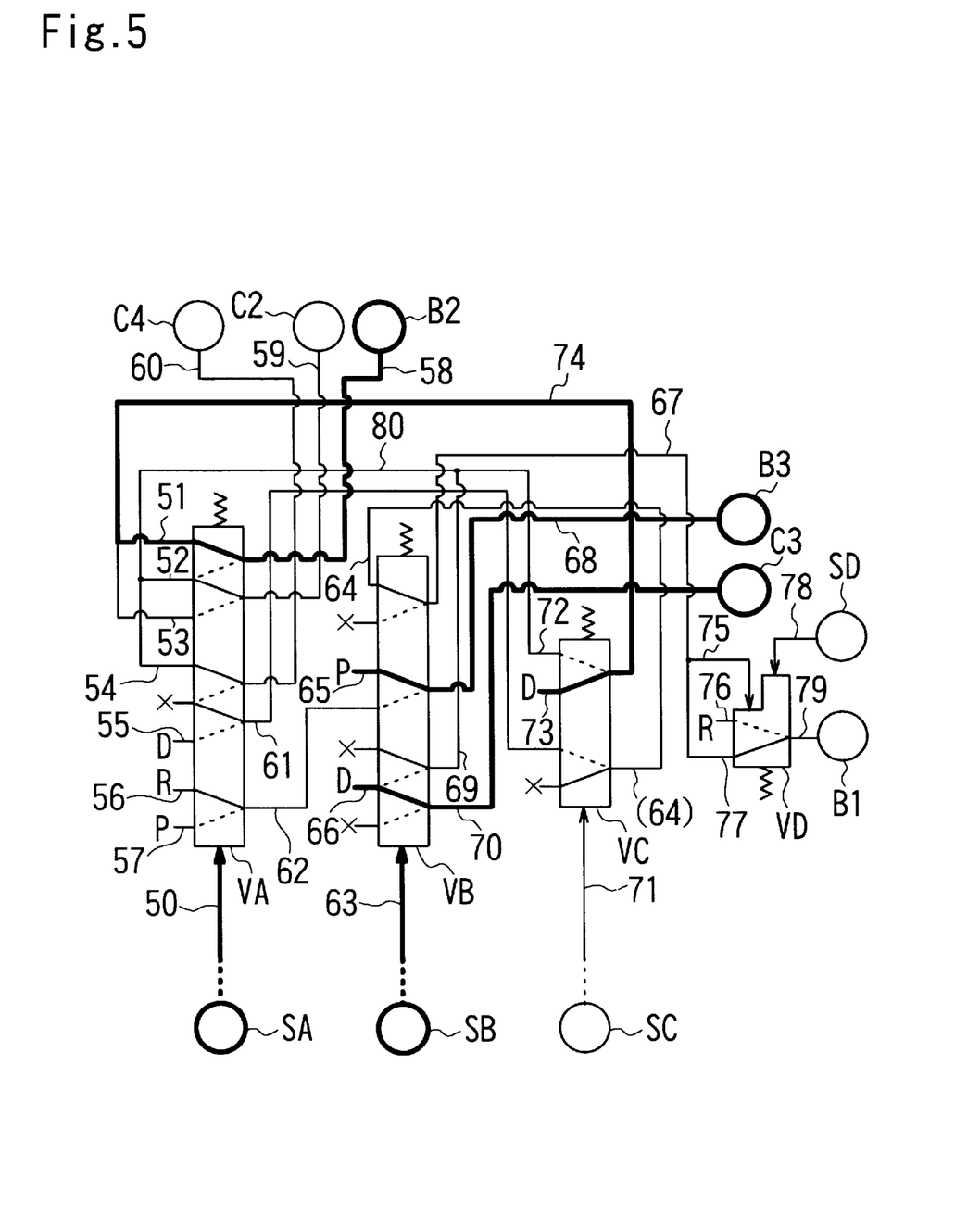
FIG. 5 is a view showing the connecting state of oil channels in the case where a second speed gear position is selected.

FIG. 5 shows the oil pressure supplied state when the second speed gear position is selected in the D range, the 3 range or the 2 range. The solenoid valves SA and SB are controlled to be on, and the solenoid valve SC is controlled to be off. Thus, the shift valves VA and VB are in the first state of being pressed up, and the shift valve VC is in the second state of being pressed down. In this case, the pilot pressure supplied to the oil channel 65 is supplied to the reduction brake B3, and the reduction brake B3 is engaged. The D range pressure supplied to the oil channel 66 is supplied to the low clutch C3, and the low clutch C3 is engaged. The D range pressure supplied to the oil channel 73 is supplied to the 2–4 brake B2 through the shift valve VC, the oil channel 74, the oil channel 51, the shift valve VA and the oil channel 58. Thus, the 2–4 brake B2 is engaged, too.

Figure 6:
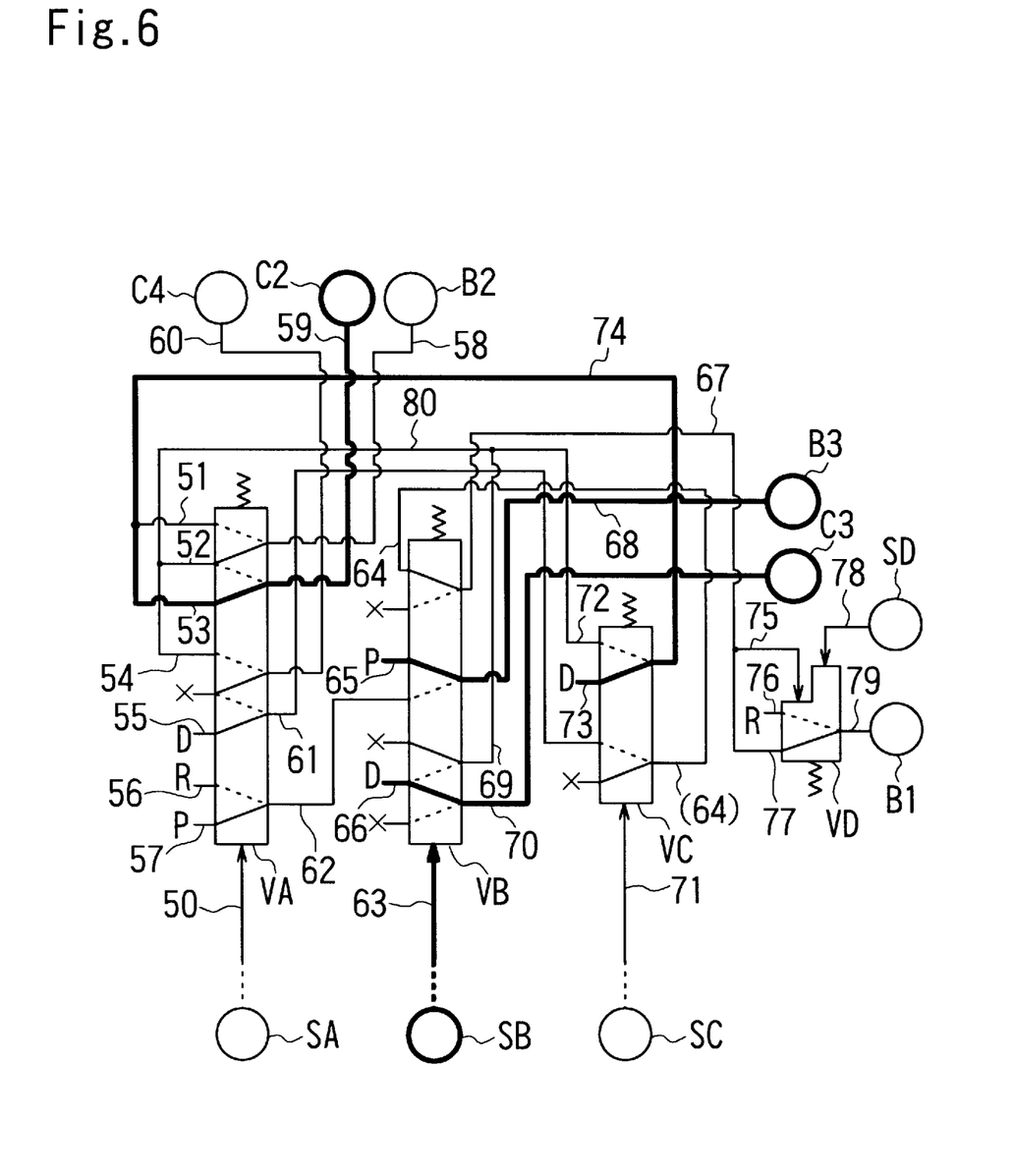
FIG. 6 is a view showing the connecting state of oil channels in the case where a third speed gear position is selected.

FIG. 6 shows the oil pressure supplied state in the case where the third speed gear position is selected in the D range or the 3 range. The solenoid valves SA and SC are controlled to be off, and the shift valves VA and VC are in the second state. The solenoid valve SB is controlled to be on, and the shift valve VB is in the first state. In this case, the pilot pressure supplied to the oil channel 65 is supplied to the reduction brake B3, and the reduction brake B3 is engaged. The D range pressure supplied to the oil channel 66 is supplied to the low clutch C3, and the low clutch C3 is engaged, too. The D range pressure supplied to the oil channel 73 is supplied to the high clutch C2 through the shift valve VC, the oil channel 74, the oil channel 53, the shift valve VA and the oil channel 59. Thus, the high clutch C2 is engaged, too.

Figure 7:
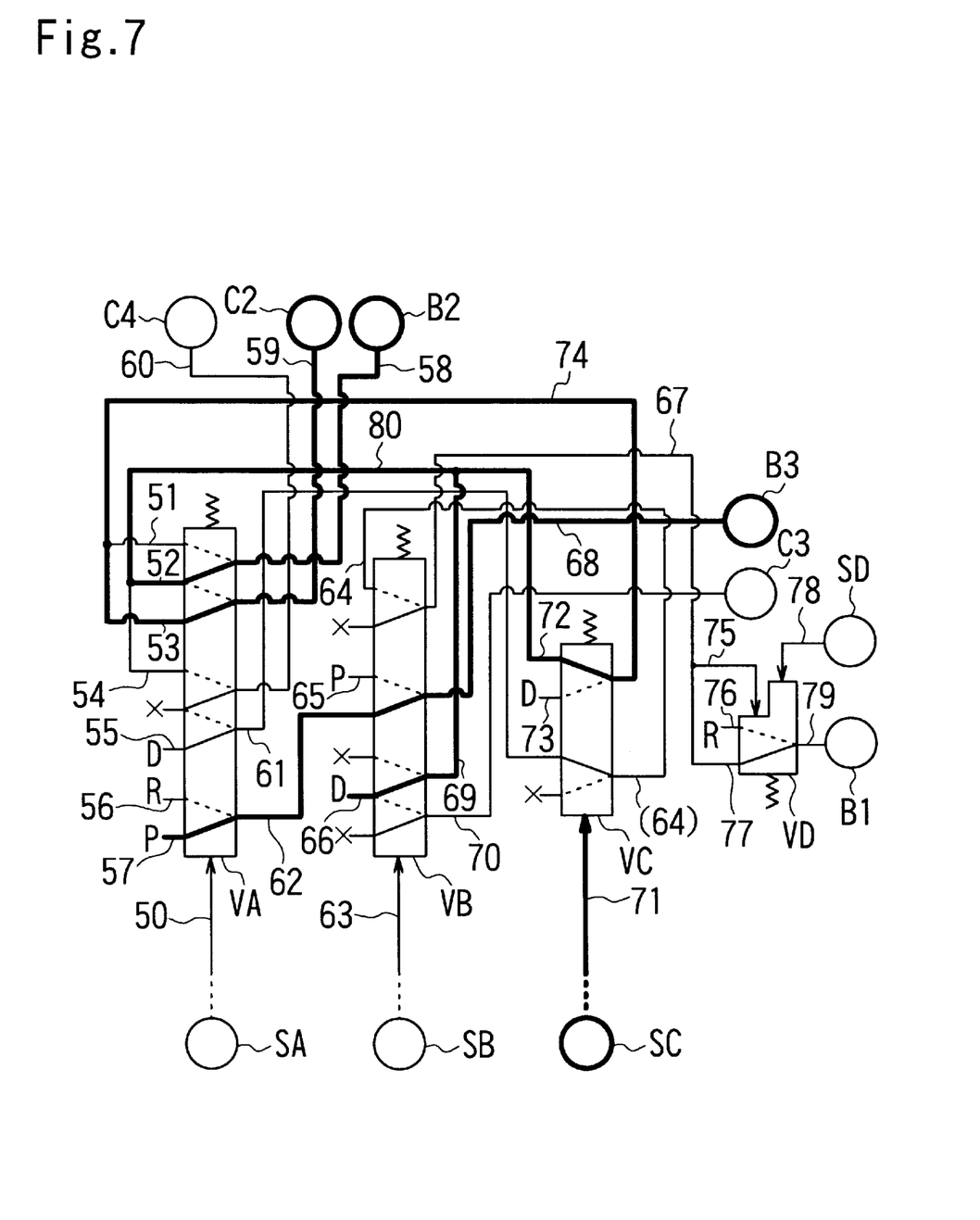
FIG. 7 is a view showing the connecting state of oil channels in the case where a fourth speed gear position is selected.

FIG. 7 shows the oil pressure supplied state in the case where the fourth speed gear position is selected in the D range. The solenoid valves SA and SB are controlled to be off, and the shift valves VA and VB are in the second state. The solenoid valve SC is controlled to be on, and the shift valve VC is in the first state. In this case, the pilot pressure supplied to the oil channel 57 is supplied to the reduction brake B3 through the shift valve VA, the oil channel 62, the shift valve VA and the oil channel 68. The reduction brake B3 is engaged.

The D range pressure supplied to the oil channel 66 is supplied to the 2–4 brake B2 through the shift valve VB, the oil channel 69, the oil channel 80, the oil channel 52, the shift valve VA and the oil channel 58. The 2–4 brake B2 is engaged, too. The D range pressure supplied to the oil channel 69 is supplied to the high clutch C2 through the oil channel 72, the shift valve VC, the oil channel 74, the oil channel 53, the shift valve VA and the oil channel 59. Thus, the high clutch C2 is also engaged.

Figure 8:
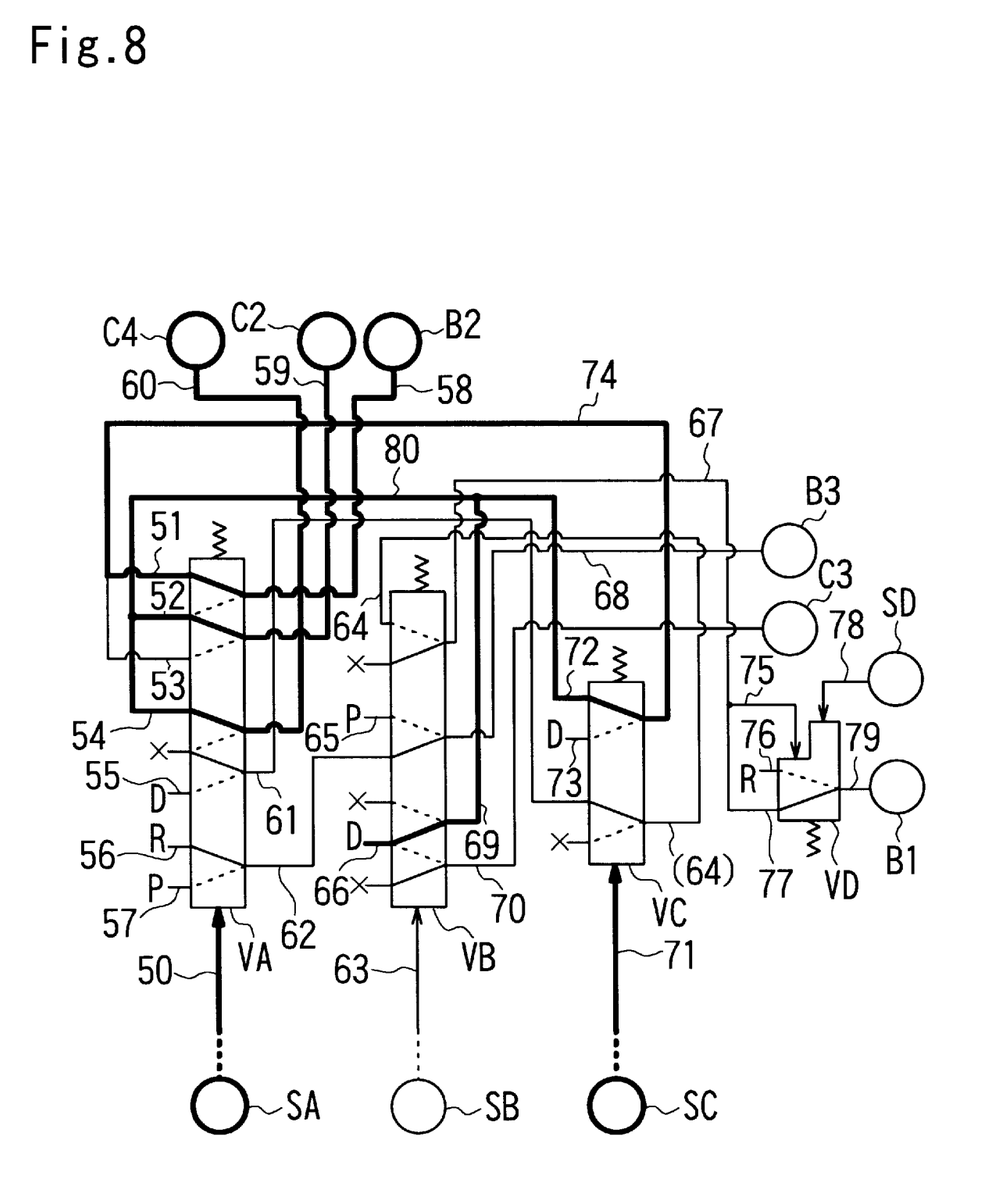
FIG. 8 is a view showing the connecting state of oil channels in the case where a fifth speed gear position is selected.

FIG. 8 shows the oil pressure supplied state in the case where the fifth speed gear position is selected in the D range. The solenoid valves SA and SC are controlled to be on, and the shift valves VA and VC are in the first state. The solenoid valve SB is controlled to be off, and the shift valve VB is in the second state. In this case, the D range pressure supplied to the oil channel 66 is supplied to the high clutch C2 through the shift valve VB, the oil channel 69, the oil channel 80, the oil channel 52, the shift valve VA and the oil channel 59. The high clutch C2 is engaged.

The D range pressure supplied to the oil channel 80 is supplied to the direct clutch C4 through the oil channel 54, the shift valve VA and the oil channel 60. The direct clutch C4 is engaged, too. The D range pressure supplied to the oil channel 69 is supplied to the 2–4 brake B2 through the oil channel 72, the shift valve VC, the oil channel 74, the oil channel 51, the shift valve VA and the oil channel 58. The 2–4 brake B2 is engaged, too.

Figure 9:
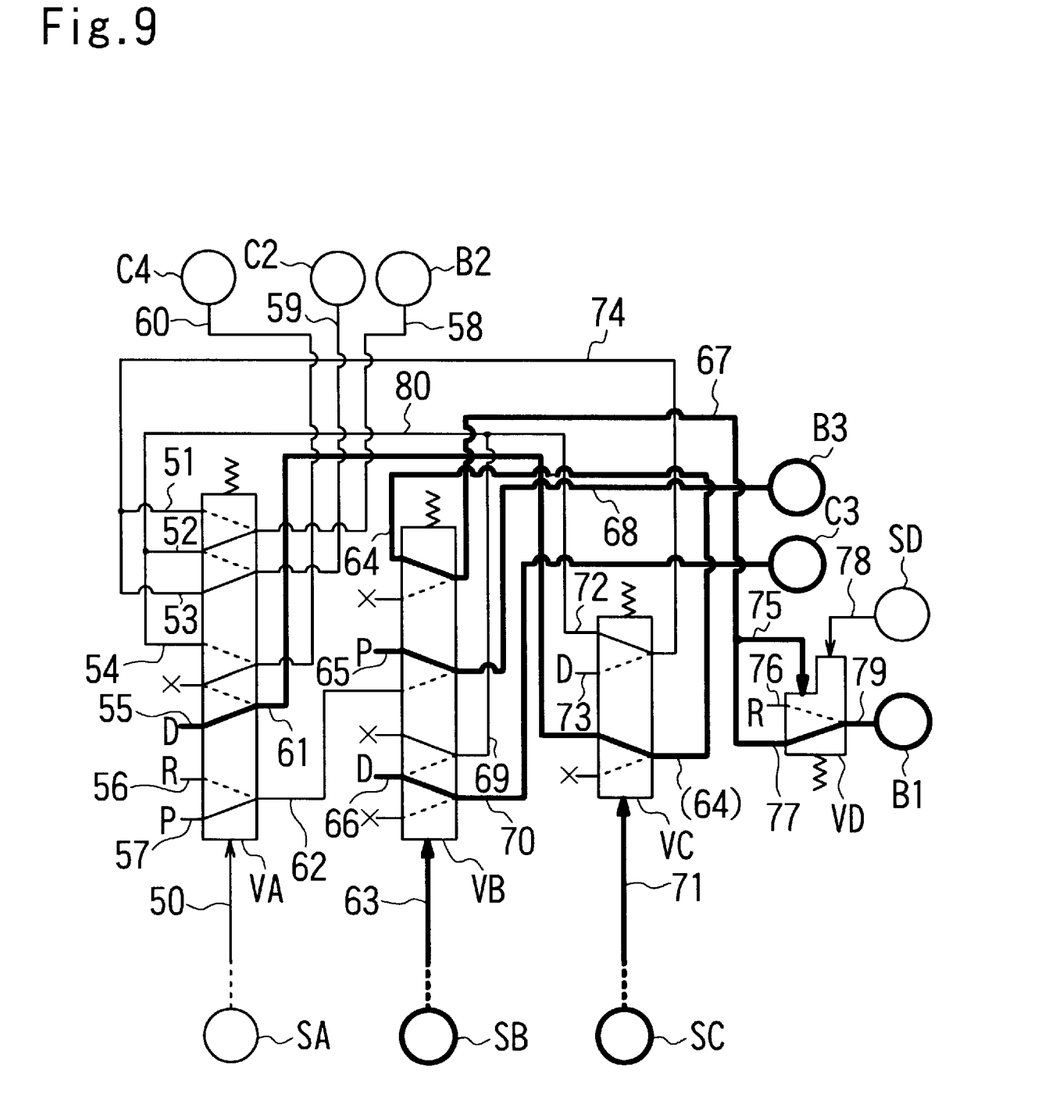
FIG. 9 is a view showing the connecting state of oil channels in the case where a first speed gear position is selected by manual designating operation.

FIG. 9 shows the oil pressure supplied state in the case where the first speed gear position wherein the engine brake is operable is selected in the 2 range or the 1 range. The solenoid valve SA is controlled to be off, and the shift valve VA is in the second state. The solenoid valves SB and SC are controlled to be on, and the shift valves VB and VC are in the first state.

In this case, the pilot pressure supplied to the oil channel 65 is supplied to the reduction brake B3 through the shift valve VB and the oil channel 68. The reduction brake B2 is engaged. The D range pressure supplied to the oil channel 66 is supplied to the low clutch C3 through the shift valve VB and the oil channel 70. The low clutch C3 is engaged, also. The D range pressure supplied to the oil channel 55 is supplied to the low reverse brake B1 through the shift valve VA, the oil channel 61, the shift valve VC, the oil channel 64, the shift valve VB, the oil channel 67, the oil channel 77, the shift valve VD and the oil channel 79. The low reverse brake B1 is engaged.

A description will now be given of the oil pressure supplied state in the case where the control operation goes wrong.

First, there will be described the oil pressure supplied state in the case where the ATCU 41 malfunctions to turn off all of the solenoid valves SA, SB and SC.

Figure 10:
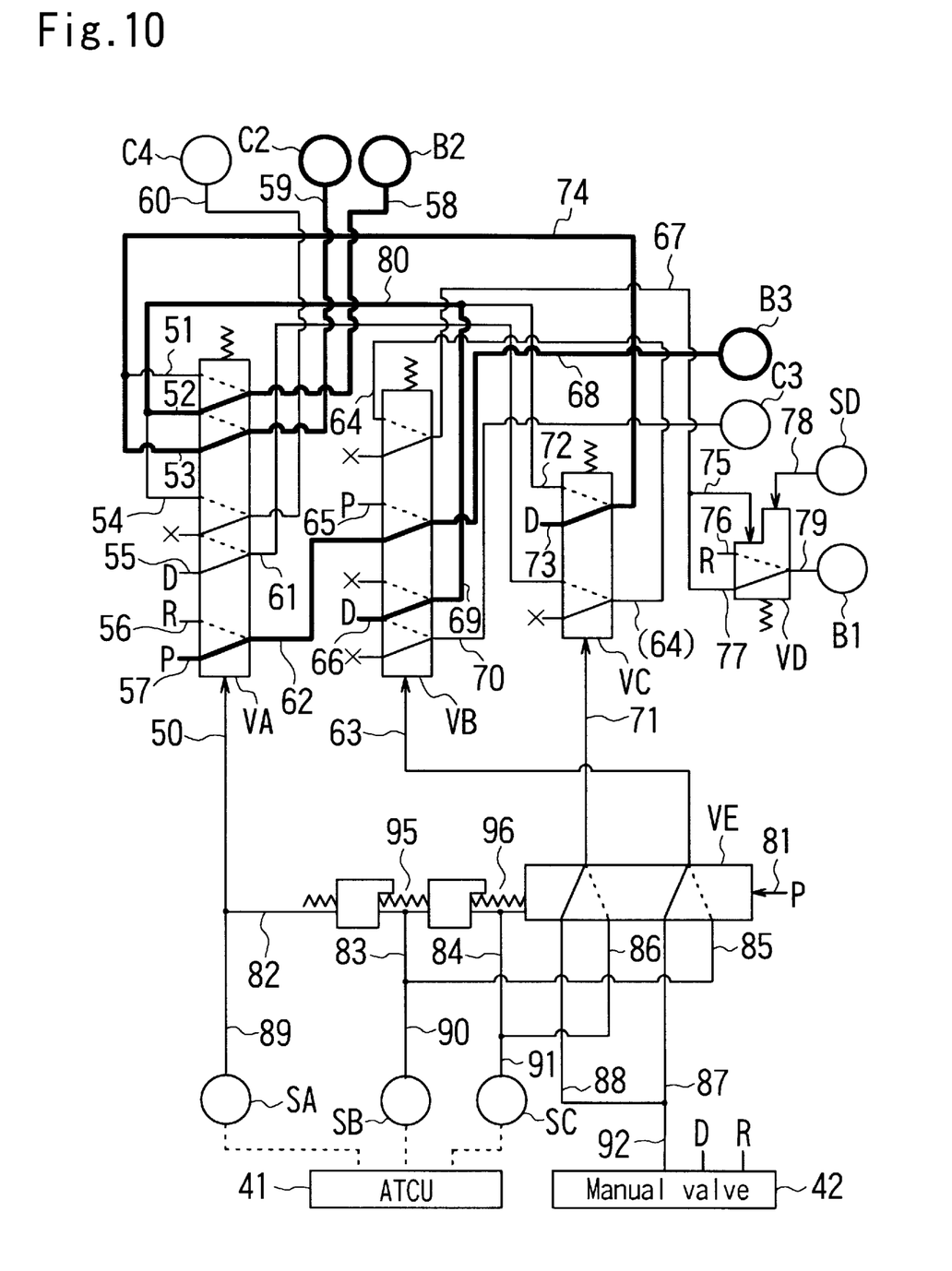
FIG. 10 is a view showing the connecting state of oil channels when a solenoid valve malfunctions while a vehicle is driven in a D range.

FIG. 10 shows the oil pressure supplied state in the case where the solenoid valves SA, SB and SC are turned off while the vehicle is driven in the D range or the 3 range. The failsafe valve VE shifts to the left, and the oil channels 88, 87 connect with the oil channels 71, 63, respectively. The oil pressure, however, is only supplied to the oil channel 92 connected to the oil channels 87 and 88 if the 1 range or the 2 range is designated. Therefore, no oil pressure is supplied to the oil channels 87 and 88, and all of the shift valves VA, VB and VC are brought into the second state.

In this case, the pilot pressure supplied to the oil channel 57 is supplied to the reduction brake B3 through the shift valve VA, the oil channel 62, the shift valve VB and the oil channel 68. The reduction brake B3 is engaged. The D range pressure supplied to the oil channel 66 is supplied to the 2–4 brake B2 through the shift valve VB, the oil channel 69, the oil channel 80, the oil channel 52, the shift valve VA and the oil channel 58. The 2–4 brake B2 is engaged, too. The D range pressure supplied to the oil channel 73 is supplied to the high clutch C2 through the shift valve VC, the oil channel 74, the oil channel 53, the shift valve VA and the oil channel 59. The high clutch C2 is also engaged. In short, the 2–4 brake B2, the reduction brake B3 and the high clutch C2 are engaged so that the vehicle can be driven at the fourth speed gear position in the normal operation.

Figure 11:
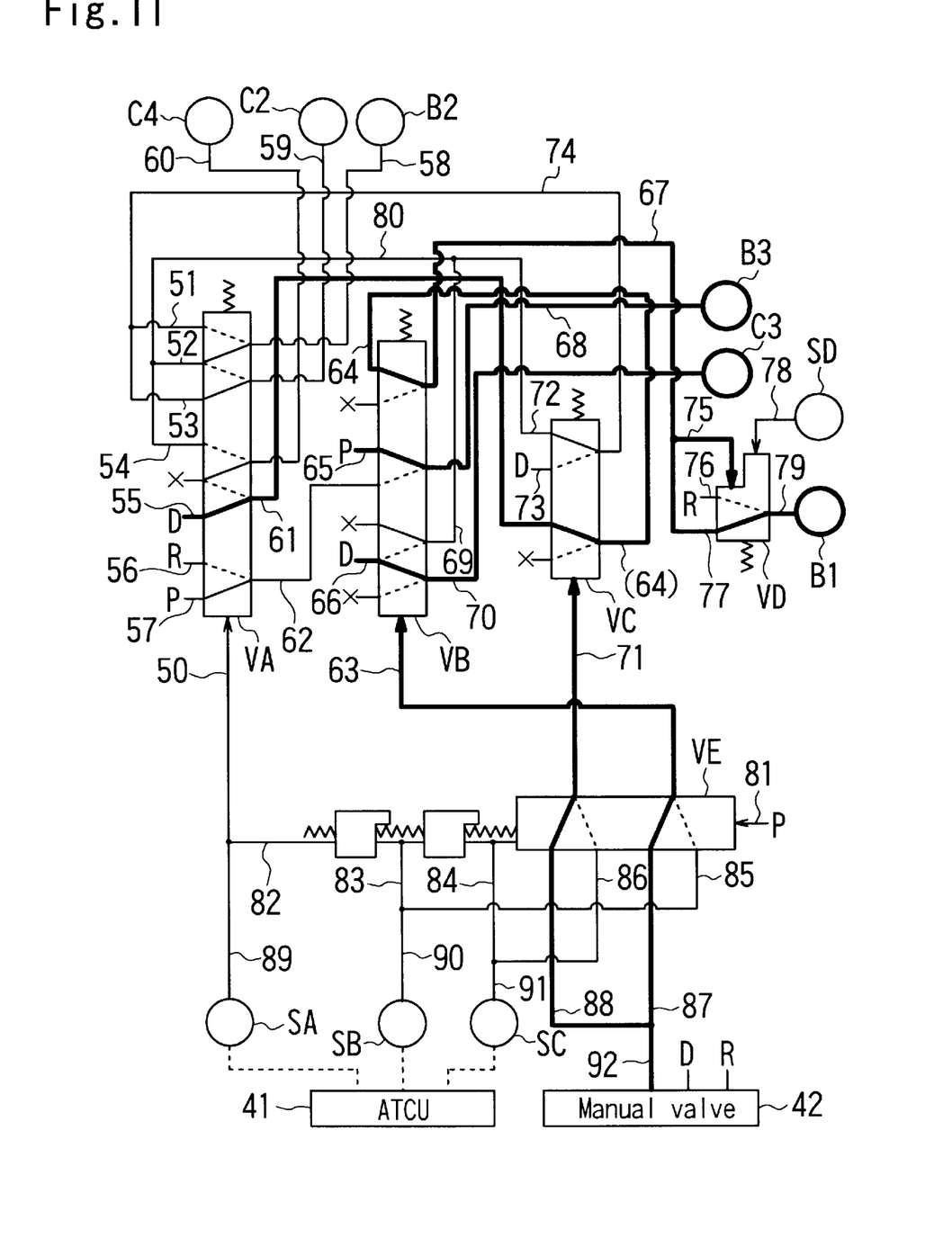
FIG. 11 is a view showing the connecting state of oil channels when a solenoid valve malfunctions while a vehicle is driven at a low speed gear position that is selected by designating operation.

FIG. 11 shows the oil pressure supplied state in the case where the ATCU 41 malfunctions during the driving with the 2 range or the 1 range being selected. As is the case with FIG. 10, the failsafe valve VE shifts to the left, and the oil channels 88, 87 connect with the oil channels 71, 63, respectively. The 1–2 range pressure is supplied from the manual valve 42 to the oil channel 92 connected to the oil channels 87 and 88, and thus, the oil pressure is supplied to the oil channels 87 and 88. The shift valves VB and VC are in the first state. At this time, the shift valve VA is in the second state, and thus, the oil pressure is supplied in the same manner as in the case where the first speed gear position wherein the engine brake is operable is selected.

Consequently, no oil pressure is supplied to all of the oil channels 50, 63 and 71 if the solenoid valves SA, SB and SC are all turned off while the vehicle is driven in the D range or the 3 range. Thus, the shift valves VA, VB and VC are brought into the second state, and the gear position is switched to the fourth speed gear position. The gear position never shifts to the first speed gear position wherein the engine brake is operable. This prevents the shock resulting from the shift.

If the ATCU 41 goes wrong to turn off all of the solenoid valves SA, SB and SC while the vehicle is driven in the 2 range or the 1 range, the 1–2 range pressure supplied from the manual valve 42 acts on the shift valves VB and VC through the oil channels 63 and 71 to thereby bring the shift valves VB and VC into the first state. Thus, the first speed gear position wherein the engine brake is operable is set.

For the reasons stated above, the first speed gear position can be selected by designating the 2 range or the 1 range even if the vehicle stops once. This makes it easier to start the vehicle again. Therefore, even if the control unit or the like malfunctions, the vehicle can be started at the first speed gear position with the engine brake being operable in the 2 range or the 1 range. Then, it is possible to switch to another range so that the vehicle is driven at the fourth speed gear position after the vehicle speed is increased. Thus, the vehicle can run by itself.

All of the solenoid valves SA, SB and SC are on in the normal operation if the first speed gear position is selected in the D range, in other words, if the vehicle is driven at the first speed gear position in which the engine brake is not operable.

If the gear position other than the first speed gear position is selected, at least one solenoid valve is off. For this reason, two or more solenoid valves are turned off if one of the solenoid valves, which should be controlled to be on, is turned off due to the braking of wire and the like. Thus, if one of the solenoid valves, which should be on, is turned off while the vehicle is driven at the gear position other than the first speed gear position; the gear position shifts to the gear position other than the first speed gear position to thereby prevent the shock resulting from the shift.

Figure 12:
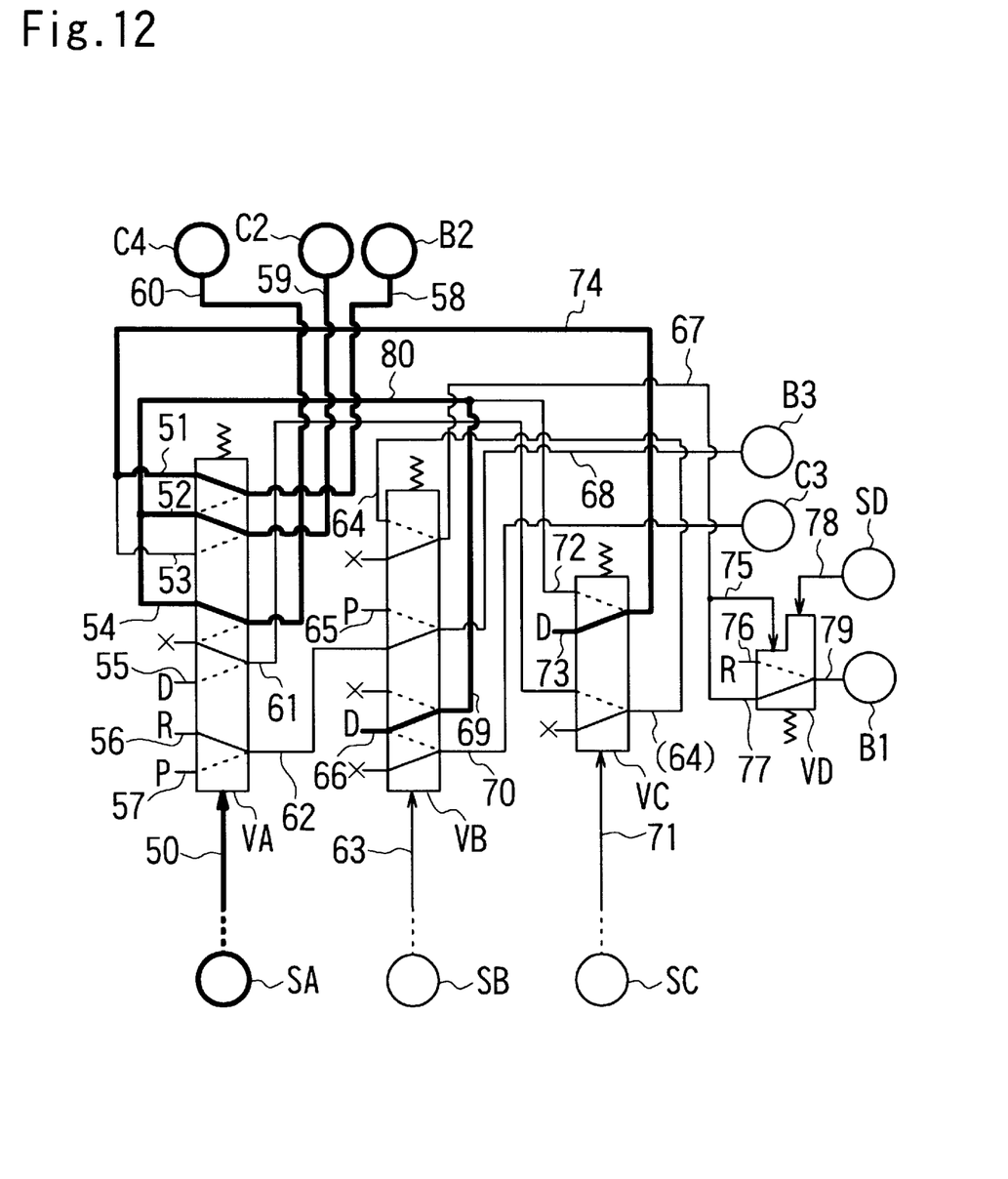
FIG. 12 is a view showing the connecting state of oil channels when a solenoid valve malfunctions in another mode.

If the solenoid valve SA is on and the solenoid valves SB and SC are off as shown in FIG. 12, the D range pressure supplied to the oil channel 66 is supplied to the high clutch C2 through the shift valve VB, the oil channel 69, the oil channel 80, the oil channel 52, the shift valve VA and the oil channel 59. The high clutch C2 is engaged. The D range pressure supplied to the oil channel 80 is supplied to the direct clutch C4 through the oil channel 54, the shift valve VA and the oil channel 60. The direct clutch C4 is also engaged.

The D range pressure supplied to the oil channel 73 is supplied to the 2–4 brake B2 through the shift valve VC, the oil channel 74, the oil channel 51, the shift valve VA and the oil channel 58. The 2–4 brake B2 is also engaged. In short, the 2–4 brake B2, the high clutch C2 and the direct clutch C4 are engaged to provide the state of the fifth speed gear position in normal operation.

Therefore, even if one of the solenoid valves, which should be on, is turned off; the gear position shifts to another preset gear position to thereby prevent an interlock and the like. Moreover, the automatic shift range in which the gear position is automatically selected and the manual setting range in which the gear positions are manually changed can be designated only by operating three solenoid valves and shift valves. This reduces the size of the control device of the automatic transmission, and simplifies the structure of the oil pressure circuit.

In this embodiment, the present invention is applied to the control device of the automatic transmission that is provided with the D range, the 3 range, the 2 range and the 1 range. The present invention, however, should not be restricted to this. For example, the control device may only be provided with the D range and the 1 range, or may be provided with a range in which the gear position is manually selected as well as the D range, the 3 range and the 2 range.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A control device of an automatic transmission, which has an automatic shift range for automatically selecting a gear position according to driving conditions of a vehicle, and manual setting ranges for manually changing gear positions and having at least a low speed engine brake range in which the vehicle is driven at a lowest speed gear position with an engine brake being operable, said control device of the automatic transmission comprising:

an operating pressure control circuit for controlling an operating pressure supplied to and released from friction elements for selectively changing power transmission routes of a transmission mechanism;

wherein said operating pressure control circuit comprises:

a plurality of shift valves for changing supply and release channels for supplying and releasing the operating pressure to and from said friction elements according to the selected gear position;

first signal pressure generating means for supplying and releasing a signal pressure for controlling shift positions of said shift valves;

shift control means for controlling said first signal pressure generating means according to the selected gear position;

second signal pressure generating means for supplying a low speed range signal pressure if a low speed engine brake range is manually designated;

first fail range achieving means for achieving a lowest speed gear position at which the vehicle is driven with the engine brake being operable if said shift control means fails and if said second signal pressure generating means supplies a low speed range signal pressure; and second fail range achieving means for achieving a predetermined gear position other than low speed gear positions if said shift control means fails and if said second signal pressure generating means does not supply said low speed range signal pressure.

2. A control device of an automatic transmission, which has automatic shift ranges for automatically selecting a gear position according to driving conditions of a vehicle, and a manual setting range for manually changing gear positions and having at least a low speed engine brake range in which the vehicle is driven at a lowest speed gear position with an engine brake being operable, said control device of the automatic transmission comprising:

a first shift valve, a second shift valve and a third shift valve for changing the connecting state of oil channels supplying an oil pressure to friction elements for setting the gear position;

a first switching oil channel for supplying an oil pressure for changing the connecting state of said first shift valve;

a first solenoid valve that is on-off controlled in such a manner as to supply an oil pressure to said first switching oil channel in a state of being on;

a second switching oil channel for supplying an oil pressure for changing the connecting state of said second shift valve;

a second solenoid valve that is on-off controlled in such a manner as to supply an oil pressure to said second switching oil channel in a state of being on in normal operation;

a third switching oil channel for supplying an oil pressure for changing the connecting state of said third shift valve;

a third solenoid valve that is ON-OFF controlled in such a manner as to supply an oil pressure to said third switching oil channel in a state of being on in normal operation;

a shift control part for controlling the ON/OFF state of said first, second and third solenoid valves according to a designated range in such a manner as to turn on said first, second and third solenoid valves if the lowest speed gear position is selected in said automatic shift driving range, and turn off said first solenoid valve and turn on said second and third solenoid valves if the lowest speed gear position at which the vehicle is driven with the engine brake being operable is selected; said shift control part turning on at least one of said first, second and third solenoid valves in normal operation;

a manual valve for selectively connecting oil pressure sources to oil channels by manual operation;

a low speed gear position selecting channels which is supplied with an oil pressure from said manual valve when said low speed engine brake range is selected;

a failsafe valve for connecting said low speed gear position selecting channels with said second and third switching oil channels if said first, second and third solenoid valves are turned off; and wherein said first, second and third shift valves connect to said friction elements in such a manner as to set a predetermined gear position other than the lower speed gear positions if the oil pressure is not supplied to the first, second and third switching oil channels.

3. A control device of an automatic transmission according to claim 2, wherein:

said automatic shift driving range includes a first speed gear position as the lowest speed gear position that is set by supplying the oil pressure to said first switching oil channel, said second switching oil channel and said third switching oil channel, and has a second speed through a fifth speed gear position as a highest speed gear position according to such a combination that the oil pressure is supplied to at least one of said first, second and third switching oil channels; and said first shift valve, said second shift valve and said third shift valve connect to friction elements in such a manner as to form oil pressure routes for supplying the oil pressure to friction elements which are engaged in a fourth speed gear position if no oil pressure is supplied to all of said first, second and third switching oil channels.

\* \* \* \* \*